Oct. 29, 1935.  V. DAHLMAN  2,019,213
AIR FILTER
Filed June 15, 1931
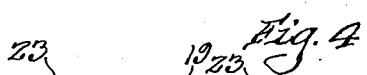
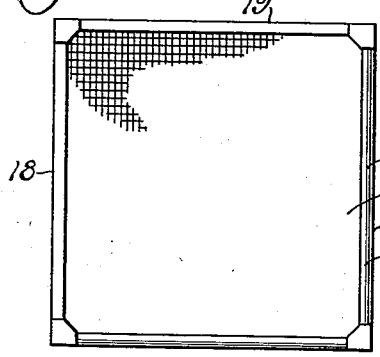
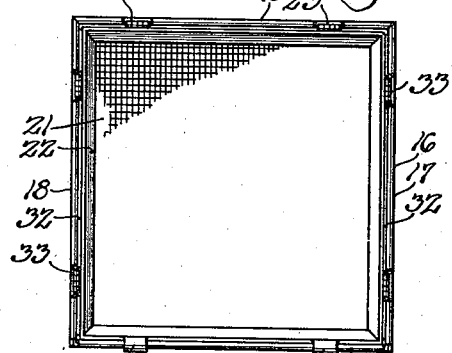
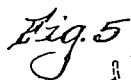
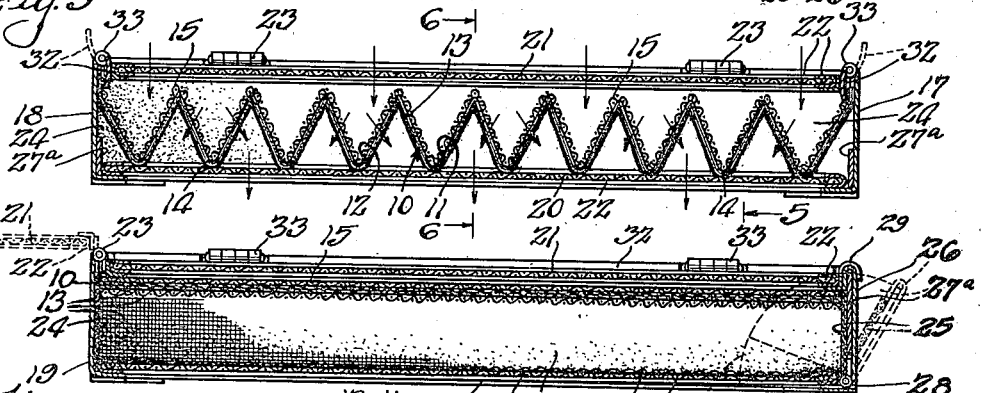
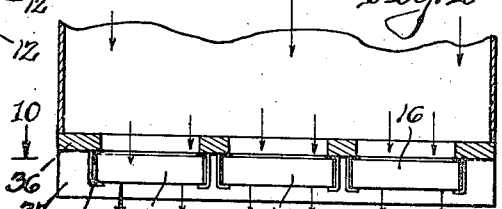
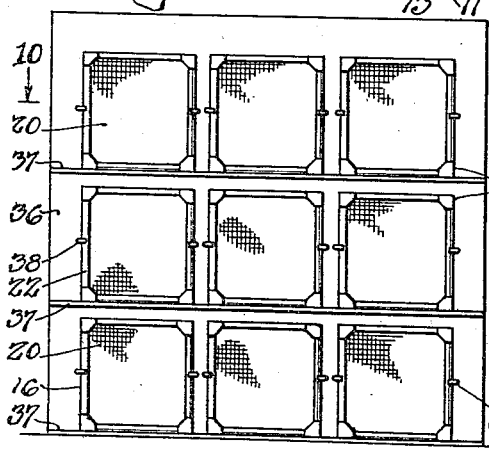
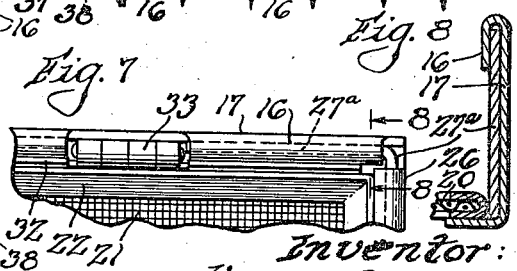
Inventor: Verner Dahlman Patented Oct. 29, 1935

2,019,213

UNITED STATES PATENT OFFICE 2,019,213

AIR FILTER

Verner Dahlman, New Lenox, Ill., assignor to Independent Air Filter Company, Chicago, Ill., a corporation of Illinois Application June 15, 1931, Serial No. 544,368

9 Claims. (Cl. 183—71)

The present invention relates to air filters and has to do with a new filter material and a new container which may be used therewith.

In the art of dry filters, it has heretofore been common to use sheet membranes, such as paper and cloth. When used, these materials have had no ability to maintain an erected or given shape.

The present invention has as an object the provision of a new and improved material which has the property of maintaining any selected configuration or shape to which it may be bent.

Another object of the invention is the provision of a suitable holder or container for the filter material herein described, and also a new and novel filter frame or box.

These and such other objects as may hereinafter appear are obtained by the novel construction, unique arrangement, and improved combinations of elements illustrated in the accompanying drawing, in which one form of the invention is set forth, and in which:

Figure 1 is a transverse section of the filtration material;

Figure 2 is a plan view of the material shown in Figure 1, laminations being broken away irregularly to show physical structure;

Figure 3 is an elevation of a container suitable for holding filter material like that shown in Figures 1 and 2;

Figure 4 is an elevation of the opposite side of the filter container shown in Figure 3;

Figure 5 is a transverse section of the container on the line 5—5 of Figure 6;

Figure 6 is a transverse section of the container on the line 6—6 of Figure 5;

Figure 7 is a fragmentary sectional detail of one corner of the device as indicated in Figures 3 to 6, inclusive;

Figure 8 is a fragmentary section taken on the line 8—8 of Figure 7;

Figure 9 is an elevation of a plurality of containers arranged to form a multiple installation; and Figure 10 is a horizontal section of such multiple unit taken on the line 10—10 of Figure 9.

Like reference characters are used to designate similar parts in the drawing and in the description of the invention hereinafter given.

The present invention insofar as it relates to a material for the filtering of air may take several forms. Only one of these is illustrated although the other forms may be incidentally mentioned.

The filter material may be cotton fiber, paper, cloth, or any suitable fibrous or other material. In association with such fibrous filter material is a reenforcement which may be a sheet of woven wire or the like. For example, the reenforcing sheet may be of a material of the nature of fly screen or a more coarse, wire cloth. In fact, the reenforcement is preferably of a coarser texture than fly screen and the wire part of less stiff strands. The meshes may be larger than in fly screen.

Such reenforcement may be disposed at one side of the filter material, or, as is preferred, it may be placed within the filter material itself. With a filter medium composed of a thin layer of cotton batting, which material is generally placed on the market with one or both of its outer surfaces sized, the medium may be split to form sheets or laminations, and the reenforcement inserted between the laminations. If desired, an adhesive may be conveniently applied to the wire reenforcement before insertion so that, after it is inserted, the layers may be pressed together to form a composite sheet. After the two layers of cotton batting are pressed upon the wire cloth, the composite sheet may then be used, allowing, of course, the necessary time for drying.

In this manner, a filtering sheet is provided with a reenforcing core which will hold the sheet in any selected form to which it may be bent. The sheets may then be bent to the shape shown in Figure 5, the folds in such sheet being well described as "accordion" or "bellow" folds. A sheet of this character provides a surface area many times greater than the area of a flat sheet having the same overall length and breadth or face dimensions. Consequently, the capacity of the filter per unit of face area is thus greatly increased.

Because of the reenforcement in the sheet described, no other form is necessarily required to maintain it in filtering position. However, the use of this material for filtering purposes will be facilitated by arranging it within an enclosing frame or container to form a filter unit. Such frame operates to support the material and to prevent any flattening-out tendency which the sheet may possess.

A suitable container for the filtering material is shown in various figures of the drawing which will now be described:

In Figures 1 and 2, a suitable form of filter material is shown. The sheet material 10, shown in Figure 2, comprises a reticulated reenforcing member 13 adhesively secured to a sheet of fibrous material having one side 11 roughened, and a side 12 sized, that is to say, treated with a suitable liquid which causes the fibers to mat together and thereby form a foraminous crust when dried. Either side of the fibrous sheet may be attached to the screen 13.

Figure 1 shows two composite sheets of the character described in connection with Figure 2. The two sheets are placed together with the fibrous material innermost and with the reenforcing members arranged over and secured to the outer faces thereof.

The filtering material shown in Figure 5 is identical to that shown in Figure 2. As previously indicated, the reticulated member 13 may have a fibrous sheet on either side thereof, in which case the filter material may be used with either side out.

The forms of filter material above described are generally produced in a long flat strip or roll and are treated to provide accordion folds therein. The reenforcing member 13 is sufficiently ductile to prevent the folds from collapsing. The material, preparatory to use in the filter frame, may be compressed into a small flat package and boxed in a convenient manner. The material so shaped may be used in the air intake of a furnace by cutting it to a proper size and fastening it over the air intake and securing the filter material at its edges to prevent admission of air except through the filter material. The filter material is flexible enough that it may be shaped to fit any sort of an opening or aperture and will hold its shape in the face of the usual currents of air flowing into a furnace.

Incoming air passing through the filter deposits dust particles contained therein on the nap of the filtering material 10. The side exposed to the inflow naturally picks up the larger portion of dust particles. By shaping the filtration material, as shown, to present various angles to the incoming column of air, the dust is more certainly removed than by a flat filter, for the air travelling through a filter having angular faces must penetrate a greater thickness of filter material to pass through the filter.

Bending the filtration material to present various angles to the incoming column of air has made a box-like container desirable. Such container is designated 16 and it has fixed side walls 17 and 18 and a fixed end wall 19. Opposite the fixed end wall 19, is a movable or pivoted end wall 26.

In Figure 9, 20 represents a protective screen face over the floor or one face of the holder and such wall or screen may consist of expanded metal. Heavy screen material may also be employed.

In Figure 4, a top view of a container 16, there is shown an expanded metal screen or cover 21 over the top of the device. The frame or sash thereabout is marked 22. Screen frame 22 is pivotally fastened to the fixed end wall 19 of the container 16 by hinges 23 (or by a single piano hinge) so that, when the screen 21 is opened, easy access to the interior of the container is permitted. When closed, screen cover 21 is securely fastened to the container by expansion clamps 29.

In Figure 6, the flat container or tray 16, between its fixed end wall 19 and pivoted end wall 26 and resting between the face screens 20 and 21, has folded filter material 10, such material being retained in position against longitudinal expansion by side walls 17 and 18. In order to prevent the passage of air around the filter material 10 adjacent the sides of the container 16, the inner walls of the container 16 are lined with felt pads or seals 24, and 25. The filter material is generally cut to a width so that its edges must be slightly forced to be brought into place between pads 24 and 25, whereby a tight joint is secured. The straight margins or end edges of the filter material as distinguished from the corrugated margins or end edges, are held tightly against the side walls 17 and 18 by means of flaps 32 mounted on the container walls by hinges 33, the flaps 32 being held in place by the screen or cover 21 when the latter is closed. Piano type hinges may be substituted for those shown in the drawing.

The pivoted end wall 26 serves a dual purpose. Being pivoted by the use of hinge 28, and guided by quadrant flanges 27a, it may be opened so that easy access to one edge of the filter material 10 may be had. Additionally, the wall 26 may be pressed against the edge of the filter material 10 to force the material transversely of the container 16 to insure tight fit of the material against the opposite end wall.

The material 10 may be removed or replaced through the opening made by the pivoted end wall 26 when desired. Because the container 16 is sometimes located in an air duct so that access to the container from its hinged face is not obtainable, the pivoted end wall 26 is indispensable when it is desired to renew the filter material. The end wall 26 also aids in maintaining the filter material in a predetermined position.

Effective filtration requires that the filter material be maintained free from edge or other leaks. As may be seen from the drawing, the pads 24 and 25 of heavy felt are designed to prevent seepage of air between them and the contiguous straight edges of the filter material. Felt seals along the zigzag edges of the filter material are penetrated by the edges of the relatively stiff material when the pivoted end 26 is closed and such felt and the felt lining of container 16 hold the filter material in the accordion folds it possesses at the time the pivoted end 26 is closed.

It is not necessary that pivoted end 26 be hinged. A telescoping drawer may be substituted therefor, or the entire sheet of material 10 may be placed in a screen like drawer, only the end of which is of non-porous material. Such a telescoping drawer may be drawn from the container to effect a renewal of the filter material.

Figures 7 and 8 discloses additional details of the construction of the container 16.

Figure 9 illustrates a multiple installation of units or containers 16. For holding the several filter units, there are provided supports 36 which may be of any suitable material. These should be of a height sufficient to accommodate the selected number of filter units. Suitable transverse members having shelves 37 are associated with the vertical members 36. The vertical supports 36 and shelves 37 are built to fill a selected air duct and leave spaced openings of a size to be covered by a unit 16. Each unit 16 is mounted over one of such apertures with its screened sides in vertical position. It may be locked on the support 37 by means of wing locks or hooks 38. Other suitable fasteners may be substituted.

The filter units 16 are thus placed in front of an air intake, the air passing therethrough, and are arranged in a manner admitting of ready replacement of filter material 10. There should be sufficient space between adjacent filter units 16 or between units 16 and shelves 37 to permit end 26 of the unit to open fully, thus providing ready access to the unit 16 for loading and unloading.

I claim:

1. An air filter comprising a frame having side walls, filter material having accordion folds therein and stretching across the interior of said frame, and a hinged end member on said frame for engaging an edge of said filter material to secure it transversely of said frame.

2. A filter comprising a frame having opposed fixed side wall members and opposed end wall members, one of which is movable, flap members on said fixed side wall members, and a self-sustaining filter medium of sheet material possessing accordion folds and maintained in selected position in said frame by said flap members and said end wall members.

3. In an air filter, a frame, foraminous face members placed at opposite faces of said frame, corrugated filter material comprising a porous sheet in combination with a reenforcing member having an accordion fold and disposed between said faces, and end member hinged in said frame, and means for interlocking one of said face members and said end member whereby they are held in close assembly.

4. An air filter comprising a frame having side walls and corrugated filter material composed of a porous sheet in combination with a reenforcing member having an accordion fold, said material being stretched across the interior of said frame and presenting two opposed corrugated edges which extend along the adjacent side walls of the frame, one of said walls being hinged to the frame.

5. An air filter comprising a frame, locking members hingedly attached to sides of said frame, a foraminous cover removably secured over one face of said frame, and filtering material having accordion-like folds therein and adapted to be fitted into said frame with edges engaged by said locking members, said cover cooperating in its secured position with said locking means to hold said filter in place.

6. In an air filter, a frame, opposing reticulated face members for said frame, one of said face members being mounted for displacement from said frame, filter material disposed intermediate said face members and comprising a porous sheet having accordion folds therein, an end member hinged to said frame, and means for interlocking said end member and said displaceable face member whereby they are held in close assembly.

7. In an air filter, an open frame, reticulated opposed face members for the faces of said frame, one of said members being mounted for displacement therefrom, filter material disposed intermediate said members and comprising a porous sheet having accordion folds therein, a side member hinged to said frame, other side or end members having means for gripping the end folds of said filter material, and means for interlocking said hinged side member and said displaceable face member whereby they are held in close assembly.

8. An air filter comprising a frame having opposed faces adapted to successively pass a current of air, frame side members about and between said faces, a sheet of filter material having accordion-like folds therein, said filter material being placed within said frame transversely of said current of air and with edges contiguous to said side members, and means for maintaining such edges against said side members.

9. An air filter comprising a frame having opposed faces adapted to successively pass a current of air, frame side members about and between said faces, a sheet of filter material having accordion-like folds therein, said filter material being placed within said frame transversely of said current of air and with edges contiguous to said side members, and spring clip means for pressing such edges against their respective side members.

VERNER DAHLMAN.